US008058338B2

(12) United States Patent
Kondo et al.

(10) Patent No.: US 8,058,338 B2
(45) Date of Patent: Nov. 15, 2011

(54) ANTICORROSIVE PIGMENT COMPOSITION AND WATER-BASED ANTICORROSIVE COATING MATERIAL CONTAINING THE SAME

(75) Inventors: Hajime Kondo, Osaka (JP); Ikuo Yoshida, Osaka (JP)

(73) Assignee: Tayca Corporation, Osaka (JP)

( * ) Notice: Subject to any disclaimer, the term of this patent is extended or adjusted under 35 U.S.C. 154(b) by 79 days.

(21) Appl. No.: 12/666,936

(22) PCT Filed: May 19, 2008

(86) PCT No.: PCT/JP2008/059121
§ 371 (c)(1),
(2), (4) Date: Dec. 28, 2009

(87) PCT Pub. No.: WO2009/001630
PCT Pub. Date: Dec. 31, 2008

(65) Prior Publication Data
US 2010/0210774 A1    Aug. 19, 2010

(30) Foreign Application Priority Data

Jun. 28, 2007 (JP) ................. 2007-169848

(51) Int. Cl.
*C08K 3/22* (2006.01)
(52) U.S. Cl. ........ 524/430; 524/433; 524/436; 423/307; 423/315; 423/635
(58) Field of Classification Search ............... 524/414, 524/430, 433, 436, 437; 423/307, 315, 635
See application file for complete search history.

(56) References Cited

U.S. PATENT DOCUMENTS 6,010,563 A    1/2000    Taketani et al.

FOREIGN PATENT DOCUMENTS

| EP | 2 163 589 A1 | 3/2010 |
|---|---|---|
| JP | 4-149278 A | 5/1992 |
| JP | 7-034269 A | 2/1995 |
| JP | 7-138775 A | 5/1995 |
| JP | 7-145340 A | 6/1995 |
| JP | 10-158546 A | 6/1998 |
| JP | 2001-240978 A | 9/2001 |
| JP | 2002-121469 A | 4/2002 |
| JP | 2003-113482 A | 4/2003 |
| JP | 2004-250628 A | 9/2004 |
| WO | WO-2009/001630 | 12/2008 |

OTHER PUBLICATIONS

Toyota Motor Corp., "Water-Based Coating Composition and Coated Article Coated with the Composition," Patent Abstracts of Japan, Publication Date: Apr. 23, 2002: English Abstract of JP2002-1211469.
Kansai Paint Co., Ltd., "Surface Treatment Method For Zinc System Plated Steel Products and Aqueous Surface Treating Composition," Patent Abstracts of Japan, Publication Date: Sep. 4, 2001; English Abstract of JP2001-240978.
Teika Corp., "Coating Composition," Patent Abstracts of Japan, Publication Date: Jun. 6, 1995; English Abstract of JP07-145340.
Teika Corp., "Rust-Preventive Pigment Composition," Patent Abstracts of Japan, Publication Date: May 30, 1995; English Abstract of JP07-138775.
Nippon Yushi Basf Coatings KK, "Powdery Coating Composition and Coated Metal Article," Patent Abstracts of Japan, Publication Date: Sep. 9, 2004; English Abstract of JP2004-250628.
Tayca Corp., "Rust Preventive Pigment Composition for Water Paint," Patent Abstracts of Japan, Publication Date: Apr. 14, 2003: English Abstract of JP2003-113482.
Teika Corp., "Anti-Corrosive Pigment Composition," Patent Abstracts of Japan, Publication Date: May 22, 1992: English Abstract of JP-04-149278.
Teika Corp., "Rustproof Pigment and Coating Material Composition," Patent Abstracts of Japan, Publication Date: Jun. 16, 1998; English Abstract of JP 10-158546.
Teika Corp., "Anti-Corrosive Pigment Composition," Patent Abstracts of Japan, Publication Date: Feb. 3, 1995; English Abstract of JP-7-034269.
International Search Report for PCT/JP2008/059121 dated Jun. 24, 2008.

*Primary Examiner* — Peter Szekely
(74) *Attorney, Agent, or Firm* — Millen, White, Zelano & Branigan, P.C.

(57) ABSTRACT

An anticorrosive pigment composition containing neither any heavy metal harmful to the environment nor zinc, which may be harmful to the environment. The composition is a product of the reaction of (a) aluminum dihydrogen tripolyphosphate, (b) a calcium compound selected among oxides, hydroxides, and carbonates, and (c) a magnesium compound selected among oxides, hydroxides, and carbonates. The composition exerts no adverse influence on the storage stability of water-based anticorrosive coating materials.

6 Claims, No Drawings

ANTICORROSIVE PIGMENT COMPOSITION AND WATER-BASED ANTICORROSIVE COATING MATERIAL CONTAINING THE SAME

FIELD OF THE INVENTION

The present invention relates to an anticorrosive pigment composition free from ecologically harmful heavy metals and zinc and a water-based anticorrosive paint containing the same.

BACKGROUND ART

Due to enhanced worldwide concern about ecologically harmful substances, anticorrosive pigments need be free from a harmful heavy metals such as Pb and Cr. Zinc phosphate and other zinc compound-based pigments have been one of such ecologically friendly anticorrosive pigments. However, it has been reported that zinc may retard the growth of aquatic organisms and, therefore, is becoming a target of ecological concern. Zinc phosphate and zinc oxide are designated as a ecologically harmful substance in some European countries for this reason. Aluminum dihydrogen tripolyphosphate is known as a base component of anticorrosive pigment containing neither heavy metals nor zinc. Since this compound is a solid acid, the formulation of this pigment adversely affects the storage stability of the paint containing the same, particularly when formulating into a water-based paint which is becoming popular today for the purpose of reducing the emission of VOC to the atmosphere.

Japanese Patent No. 3,186.908, assigned to Tayca Corporation, discloses an anticorrosive pigment intended to be formulated into a water-based anticorrosive paint. The pigment comprises aluminum dihydrogen tripolyphosphate which has been treated to replace two protons with ammonia, combined with zinc dioxide and/or oxide or hydroxide of an alkaline earth metal. Replacement of protons of the starting aluminum dihydrogen tripolyphosphate causes to substantially diminish its acidic nature and is effective for the prevention of the adverse effect on the storage stability when incorporated into a water-based anticorrosive paint. The treatment with ammonia requires, however, additional steps and thus additional costs.

Japanese Patent No. 3,440,325, also assigned to Tayca Corporation, discloses another anticorrosive pigment to be incorporated into a water-based anticorrosive paint, which comprises aluminum dihydrogen tripolyphosphate and magnesium hexasilicate. This pigment finds use in a water-based anticorrosive paint comprising vinyl chloride-vinylidene chloride copolymer emulsions.

A need exists, therefore, for an anticorrosive pigment composition free from harmful heavy metals and zinc, which does not deteriorate, when incorporated into a water-based paint formulation, the storage stability of the paint while exhibiting a sufficient anticorrosive performance at least as high as the known zinc phosphate type anticorrosive pigment.

DISCLOSURE OF THE INVENTION

1. Summary of the Invention

According to the present invention, the above need can be met by providing an anticorrosive pigment composition comprising a reaction product of
(a) aluminum dihydrogen tripolyphosphate, with
(b) 0.05 to 5.0 parts per 1.0 parts by weight of (a) of a calcium compound selected from the group consisting of the oxide, hydroxide and carbonate, and
(c) 0.01 to 1.0 part per 1.0 parts by weight of (a) of a magnesium compound selected from the group consisting of the oxide, hydroxide and carbonate.

In another aspect, the present invention provides a process for producing the anticorrosive pigment composition of the present invention comprising the steps of reacting said phosphate (a) with said calcium compound (b) and said magnesium compound (c) in said proportions in water at a temperature between room temperature and 100° C., filtering the reaction mixture, and drying the filter cake thus recovered.

The present invention also relates to a water-based anticorrosive paint comprising the anticorrosive pigment composition of the present invention.

2. Best Mode for Carrying out the Invention

The anticorrosive pigment composition of the present invention comprise a reaction product of (a) aluminum dihydrogen tripolyphosphate with (b) a calcium compound selected from the group consisting of the oxide, hydroxide and carbonate, and (c) a magnesium compound selected from the group consisting of the oxide, hydroxide and carbonate. Among the calcium and magnesium compounds, calcium hydroxide and magnesium oxide are preferable.

The calcium compound (b) represented by calcium hydroxide primarily functions to enhance the storage stability of a water-based anticorrosive paint containing the anticorrosive pigment of the present invention. In order to fully achieve this effect, the weight ratio of the calcium compound (b) to the phosphate (a) lies at least 0.05, preferably greater than 0.1, and more preferably greater than 0.2. However, it is not necessary to react the calcium compound (b) with the phosphate (a) in large excess and excessive proportions of the calcium compound (b) are not preferable as the excessive proportions decrease the anticorrosive power of the anticorrosive pigment when compared in the unit weight. Accordingly, the proportion of the calcium compound (b) per 1.0 parts by weight of the phosphate (a) will be up to 5.0 parts, preferably less than 1.5 parts, more preferably less than 1.0 parts by weight. The magnesium compound (c) acts to enhance the anticorrosive performance of the anticorrosive pigment composition free from the magnesium compound (c). The proportion thereof per 1.0 parts by weight of the phosphate (a) lies suitably from 0.01 to 1.0 parts, preferably from 0.05 to 0.3 parts by weight.

In the present invention, it is important that aluminum dihydrogen tripolyphosphate (a) no longer acts as a solid acid in the anticorrosive paint by the reaction with a base such as calcium hydroxide. This reaction may be carried out by reacting aluminum dihydrogen tripolyphosphate (a) with the calcium compound (b) in water. The magnesium compound (c) may be added to the reaction mixture before, during or after the reaction with the calcium compound (b). The reaction temperature may be between room temperature and 100° C., preferably between 50° C. and 100° C. The reaction time varies depending upon particular reaction temperature employed and generally between 30 minutes and 3 hours. In a particularly preferred reaction process, a slurry of calcium hydroxide suspended in water is heated to about 60° C. and aluminum dihydrogen tripolyphosphate is added to the slurry. The temperature is elevated to about 80° C. and the mixture is stirred for about one hour. Then the magnesium compound (c) is added to the mixture and allowed to react with stirring at the same temperature for about one hour. After the reaction, the slurry is filtered and the resulting filter cake is dried and pulverized.

The anticorrosive pigment composition of the present invention thus produced demonstrates in the X-ray diffraction analysis decreased peak intensities in general indicating partial transformation of crystalline aluminum dihydrogen tripolyphosphate to amorphous form. In addition, the solid state NMR analysis of the anticorrosive pigment of the present invention revealed that the pigment contains not only a tripolyphosphate consisting of three phosphorus atoms but an orthophosphate consisting of single phosphorus atom. It is postulated from these results that not only calcium ions have been incorporated between layers of crystalline aluminum dihydrogen tripolyphosphate through intercalation but a portion of aluminum dihydrogen tripolyphosphate is decomposed by the reaction with calcium hydroxide to form calcium and aluminum orthophosphates.

The anticorrosive pigment composition of the present invention may be formulated in any type of anticorrosive paints including solvent type, water-based type, thermosetting type and air drying type. However, the pigment composition is especially suitable as a anticorrosive pigment to be formulated in a water-based anticorrosive paint since the pigment composition does not compromise the storage stability of the paint owing to increased viscosity or gelling with time. Such a paint is, of course, free from harmful heavy metals as well as VOC and represents an environmentally friendly anticorrosive paint.

Any type of binder or vehicle resins known in the field of coating industry may be used in the anticorrosive paint of the present invention including the solution, emulsion and dispersion types of vinyl resins, acrylic resins, alkyd resins, polyester resins, polyurethane resins, epoxy resins, phenol resins, aminoplast resins, fluorocarbon resins, silicone resins and their modified resins. The anticorrosive pigment composition of the present invention may also be formulated in cationic and anionic electrodeposition paints as an anticorrosive pigment. The anticorrosive pigment composition of the present invention may be incorporated into a water-based anticorrosive paint in an amount from 1 to 50%, preferably from 5 to 20% by weight of the binder resin as solids. The paint may comprise, of course, any conventional additives such as body pigments, coloring pigments, emulsifiers, thickening agents and the like.

EXAMPLE

The following examples are intended to illustrate the present invention in further detail and should by no means be construed as being limitative. All parts and percents therein are by weight unless otherwise indicated.

Example 1

To 1,000 g of deionized water was added 15 g of calcium hydroxide (slaked lime available from Calfine Co.) to make a slurry. To the slurry heated to about 60° C. was added 255 g of aluminum dihydrogen tripolyphosphate (K-Fresh #100P, Tayca Corporation). The mixture was then heated to about 80° C. and stirred at this temperature for one hour. After adding 30 g of magnesium oxide (Kyowamag, Kyowa Chemical Industry Co.), the mixture was stirred at the same temperature for one hour. Thereafter, the slurry was dewatered by filtration. The resulting filter cake was dried at 100° C. for 12 hours and then pulverized to obtain the anticorrosive pigment composition of the present invention.

Examples 2-7

The procedure of Example 1 was followed with different amounts of aluminum dihydrogen tripolyphosphate, calcium hydroxide and magnesium oxide as indicated in Table 1 to obtain the anticorrosive pigment composition of the present invention.

Example 8

To 1,000 g of deionized water was added 30 g of magnesium oxide to make a magnesium oxide slurry. To the slurry heated to about 60° C. was added 225 g of aluminum dihydrogen tripolyphosphate. The mixture was then heated to about 80° C. and stirred for one hour at this temperature. After adding 45 g of calcium hydroxide, the mixture was stirred for one hour at the same temperature. Thereafter, the slurry was dewatered by filtration. The resulting filter cake was dried at 100° C. for 12 hours and then pulverized to obtain the anticorrosive pigment composition of the present invention.

Example 9

To 1,000 g of deionized water were added 45 g of calcium hydroxide and 30 g of magnesium oxide together to make a slurry of a mixture of calcium hydroxide and magnesium oxide. To the slurry heated to about 60° C. was added 225 g of aluminum dihydrogen tripolyphosphate and the mixture was stirred for 2 hours at about 80° C. Thereafter, the slurry was dewatered by filtration and the resulting filter cake was dried at 100° C. for 12 hours foiled by pulverization to obtain the anticorrosive pigment composition of the present invention.

Comparative Example 1

45 g of calcium hydroxide (slaked lime, Calfine Co.), 255 g of aluminum dihydrogen tripolyphosphate (K-Fresh #100P, Tayca Corporation) and 30 g of magnesium oxide (Kyowamag, Kyowa Chemical Industry Co.) were dry blended to prepare an anticorrosive pigment composition for comparison purposes.

Comparative Example 2

Aluminum dihydrogen tripolyphosphate (K-Fresh #100P, Tayca Corporation) was used in Comparative Example 2.

Comparative Example 3

Zinc phosphate (ZPF available from Sakai Chemical Industry Co.) was used in Comparative Example 3 as a zinc containing anticorrosive pigment.

Material charges in Examples and Comparative Examples are shown in Table 1 below.

TABLE 1

| | | Material | | | | | |
|---|---|---|---|---|---|---|---|
| | Water(g) | 1st Reactant(g) | | 2nd Reactant(g) | | 3rd Reactant(g) | |
| Ex. 1 | 1000 | Ca(OH)$_2$ | 15 | ATP[1] | 255 | MgO | 30 |
| Ex. 2 | 1000 | Ca(OH)$_2$ | 45 | ATP | 225 | MgO | 30 |
| Ex. 3 | 1000 | Ca(OH)$_2$ | 75 | ATP | 195 | MgO | 30 |
| Ex. 4 | 1000 | Ca(OH)$_2$ | 150 | ATP | 120 | MgO | 30 |
| Ex. 5 | 1000 | Ca(OH)$_2$ | 225 | ATP | 45 | MgO | 30 |
| Ex. 6 | 1000 | Ca(OH)$_2$ | 60 | ATP | 225 | MgO | 15 |
| Ex. 7 | 1000 | Ca(OH)$_2$ | 72 | ATP | 225 | MgO | 3 |
| Ex. 8 | 1000 | MgO | 30 | ATP | 225 | Ca(OH)$_2$ | 45 |
| Ex. 9 | 1000 | Ca(OH)$_2$ MgO | 45 30 | ATP | 225 | — | |
| Comp. Ex. 1 | Dry Blend | Ca(OH)$_2$ | 45 | ATP | 225 | MgO | 30 |

TABLE 1-continued

| | Material | | | |
|---|---|---|---|---|
| | Water(g) | 1st Reactant(g) | 2nd Reactant(g) | 3rd Reactant(g) |
| Comp. Ex. 2 | | ATP | | |
| Comp. Ex. 3 | | Zinc phosphate[2] | | |

[1] Aluminum dihydrogen tripolyphosphate, K-Fresh #100P, Tayca Corporation
[2] ZPF, Sakai Chemical Industry Co.

Evaluation Test of Anticorrosive Paints

Air-drying anticorrosive paints were prepared using anticorrosive pigment compositions of Examples and Comparative Examples. The paints were applied on test panels for evaluating anticorrosive performance. The paints were also tested for storage stability. The followings are details of the test method.

Preparation of Paints

Air-drying emulsion paints were prepared according to the formulation of Table 2.

TABLE 2

| Paint Formulation | |
|---|---|
| | Amount (weight parts) |
| Material (Group I) | |
| Water | 62.7 |
| Methylcarbitol(solvent) | 57.8 |
| Tamol 165(dispersant, Rohm & Haas) | 8.3 |
| Triton CF-10(surfactant) | 1.0 |
| Nopco DF-122NS(defoaming agent) | 2.8 |
| Acrysol RM-2020NPR (Thickening agent, Rohm & Haas) | 20.2 |
| Material (Group II) | |
| Bayferox (ferric oxide pigment, Bayer) | 55.5 |
| Calcium carbonate SL-1500 (body pigment, Takehara Chemical Co.) | 150.0 |
| Anticorrosive pigment (see, Table 1) | 25.0 |
| Material (Group III) | |
| Maincote HG-54D (acrylate-styrene copolymer emulsion, 40% solids, Rohm & Haas) | 59.15 |
| Texanol CS-12 (auxiliary film forming agent, Chisso Corp.) | 15.0 |
| Dibutyl phthalate (plasticizer) | 15.0 |
| Nopco DF-122NS (defoaming agent) | 3.4 |
| 15% Sodium nitrite (spot rust preventing agent) | 7.4 |
| 28% ammonia water (neutralizing agent) | 4.0 |
| Total | 1004.8 |

To a vessel provided with a high speed disperser were added water, solvent and other materials of Group I. To the resulting dispersion were gradually added pigment materials of Group II while cooling the vessel. After the addition of all pigments, the dispersion was stirred with the disperser at 6,000 rpm for 30 minutes to disperse the pigment to a particle size less than 40 μm. Separately, all materials of Group III other than ammonia were added stepwise to a separate container with stirring to prepare a vehicle solution. This solution was added to the vessel containing the above pigment dispersion and stirred together with the pigment dispersion by the disperser rotating at a low speed. Finally, the pH of the paint was adjusted to 8.5 with ammonia.

Coating Conditions

Test panels were prepared by applying the paint prepared as above onto a degreased mild steel plate (JIS G 3141, SRCC-SB available from Nippon Test Panels Co.) using a bar coater to a dry film thickness of 38-41 μm and then air dried at 40° C. for 60 hours.

Anticorrosive Tests (Maximum Total 40 Points)

1. Salt Spray Test (SST) (Maximum 15 Points)

The coating film on the test panel was cut in a cross with knife reaching the substrate. The panel was then placed in a spray tester and continuously sprayed with a 5% aqueous solution of NaCl at a chamber inner temperature of 35° C. at a spray pressure of 1 kg/cm$^2$ for 168 hours. The rust and blister developed on the panel were observed. The anticorrosive efficacy of the paint was evaluated in term of the areas of rust and blister in flat area and the width of corrosion developed along the cut line. In both evaluation results, the higher in the evaluation point, the higher in the rust preventing efficacy.

Evaluation schedule for the prevention of rust in flat area according to ASTM D610-68 (1970)

| Percents of rust in flat area | Point |
|---|---|
| <0.03% | 5 |
| 0.03, 0.1% | 4 |
| 0.3, 1% | 3 |
| 3% | 2 |
| 10% | 1 |
| ≧16% | 0 |

Evaluation schedule for the prevention of blister in flat area according to ASTM D714-59 (1965)

| Status | Point |
|---|---|
| No blister | 5 |
| 8F | 4 |
| 8M, 6F, 4F | 3 |
| 8MD, 6M | 2 |
| 8D, 2F | 1 |
| ≧6MD, ≧4MD, ≧2M | 0 |

Evaluation schedule for the width of corrosion in cut area

| Corrosion width | Point |
|---|---|
| 0-1 mm | 5 |
| 1-2 mm | 4 |
| 2-4 mm | 3 |
| 4-7 mm | 2 |
| 7-10 mm | 1 |
| >10 mm | 0 |

2. Composite Cycle Test (CCT) (Maximum 15 Points)

As in the salt spray test, the coating film on the test panel was cut in a cross with knife reaching the substrate. The panel was then placed in a composite cycle tester and subjected to the anticorrosive test for plating according to JIS H 8502The panel was (1) sprayed with a 5% aqueous solution of NaCl at 35° C. for 2 hours, (2) dried at 60° C. for 4 hours, and (3) exposed to humid condition at a relative humidity above 95% at 50° C. for 2 hours in one cycle. This cycle was repeated 63 times (504 hours). The rust and blister developed on the panel were observed. The anticorrosive efficacy was evaluated according to the same evaluation schedule for the salt spray test.

3. Humidity Resistance Test (HT) (Maximum 10 Points)

The test panel without cutting was placed in a humidity resistant tester at a relative humidity above 95% at a chamber inner temperature of 50° C. for 504 hours. The blister of the coating film was observed and evaluated according to the same evaluation schedule for blister in flat area in the salt spray test.

The results of anticorrosive test are shown in Table 3 below.

TABLE 3

Anticorrosive Test

| Pigment | SST, 168 hrs. (Max. 15) | CCT, 504 hrs. (Max. 15) | HT, 504 hrs. (Max. 10) | Total (Max. 40) |
|---|---|---|---|---|
| Ex. 1 | 11 | 10 | 10 | 31 |
| Ex. 2 | 15 | 12 | 10 | 37 |
| Ex. 3 | 13 | 11 | 10 | 34 |
| Ex. 4 | 11 | 9 | 9 | 29 |
| Ex. 5 | 10 | 8 | 9 | 27 |
| Ex. 6 | 13 | 10 | 9 | 32 |
| Ex. 7 | 9 | 8 | 10 | 27 |
| Ex. 8 | 13 | 11 | 10 | 34 |
| Ex. 9 | 13 | 11 | 10 | 34 |
| Comp. Ex. 1 | 8 | 8 | 4 | 20 |
| Comp. Ex. 2 | 3 | 6 | 4 | 13 |
| Comp. Ex. 3 | 7 | 10 | 8 | 25 |

Storage Stability Test

A sample of each paint prepared according to the formulation shown in Table 2 was placed in an isothermal chamber maintain at a constant temperature of 40° C. for 28 days. The change of viscosity with time was determined at several intervals using a B-type viscometer. The less in the viscosity change the more stable. In the extreme case, the paint becomes a gel and not usable. The result are shown in Table 4 below.

TABLE 4

Storage Stability Test, at 40° C.

Viscosity in cps (No. 4 Roter, 60 rpm), Days

| Pigment | Initial | 1 | 7 | 14 | 21 | 28 |
|---|---|---|---|---|---|---|
| Ex. 1 | 3800 | 3700 | 3820 | 3900 | 3930 | 3820 |
| Ex. 2 | 3630 | 3650 | 3480 | 3180 | 3100 | 3060 |
| Ex. 3 | 3540 | 3520 | 3600 | 3280 | 3270 | 3050 |
| Ex. 4 | 3090 | 3280 | 3620 | 3640 | 3460 | 3050 |
| Ex. 5 | 3350 | 2910 | 2560 | 2600 | 2650 | 2830 |
| Ex. 6 | 3230 | 3250 | 3250 | 3260 | 3300 | 3160 |
| Ex. 7 | 3050 | 3400 | 3500 | 3660 | 3880 | 3860 |
| Ex. 8 | 3480 | 3540 | 3490 | 3420 | 3050 | 3210 |
| Ex. 9 | 3650 | 3610 | 3480 | 3390 | 3220 | 3220 |
| Comp. Ex. 1 | 6650 | 6810 | >10000 | Gelled | — | — |
| Comp. Ex. 2 | 7500 | >10000 | Gelled | — | — | — |

TABLE 4-continued

Storage Stability Test, at 40° C.

Viscosity in cps (No. 4 Roter, 60 rpm), Days

| Pigment | Initial | 1 | 7 | 14 | 21 | 28 |
|---|---|---|---|---|---|---|
| Comp. Ex. 3 | 2580 | 2840 | 2930 | 2870 | 2870 | 2560 |

As demonstrated in Table 3, the pigment compositions of Examples 1-9 exhibit high evaluation points in all test items for anticorrosive test though they do not comprise zinc which is known to be effective for the prevention of rust on steel products. The pigment compositions of Examples 1-9 are even higher in the anticorrosion performance than the pigment composition of Comparative Example 3 containing Zinc.

Also as demonstrated in Table 4, the pigment compositions of Examples 1-9 do not adversely affect the storage stability when formulated in water-based paints while the pigment compositions of Comparative Examples 1 and 2 remarkably decrease the storage stability when formulated in water-based paints.

The invention claimed is:

1. An anticorrosive pigment composition comprising
   (a) aluminum dihydrogen tripolyphosphate,
   (b) 0.05 to 5.0 parts per 1.0 parts by weight of (a) of calcium hydroxide, and
   (c) 0.01 to 1.0 parts per 1.0 parts by weight of (a) of magnesium oxide, said component (b) and (c) having reacted with said component (a) at least in part so that the pigment may be incorporated into a water-based anticorrosive paint formulation without compromising the storage stability thereof.

2. The anticorrosive pigment composition according to claim 1 wherein the amount of said component (b) is 0.1-1.5 parts per 1.0 parts by weight of said component (a), and wherein the amount of said component (c) is 0.05 to 0.3 parts per 1.0 parts by weight of said component (a).

3. A process for producing an anticorrosive pigment composition comprising the steps of:
   reacting (a) aluminum dihydrogen tripolyphosphate, (b) calcium hydroxide and (c) magnesium oxide together in water at a weight ratio (b)/(a) from 0.05 to 5.0 and a weight ratio (c)/(a) from 0.01 to 1.0 at a temperature between 50° C. and 100° C. for a period of time at least 30 minutes;
   removing water from the reaction mixture by filtration; and
   drying and pulverizing the filter cake.

4. The process according to claim 3 wherein aluminum dihydrogen tripolyphosphate is added to an aqueous slurry of calcium hydroxide in the first step and magnesium oxide is added thereafter.

5. The process according to claim 3 wherein aluminum dihydrogen tripolyphosphate is added to an aqueous slurry containing both calcium hydroxide and magnesium oxide in the first step.

6. A water-based anticorrosive paint comprising an effective amount of the pigment composition of claim 1 in an aqueous solution, emulsion or dispersion of a film-forming resin.

* * * * *